(12) United States Patent
Hansson et al.

(10) Patent No.: US 8,543,282 B2
(45) Date of Patent: Sep. 24, 2013

(54) REMOTE DIAGNOSIS MODELLING

(75) Inventors: Jörgen Hansson, Halmstad (SE);
Magnus Svensson, Göteborg (SE);
Thorsteinn Rögnvaldsson, Halmstad (SE); Stefan Byttner, Halmstad (SE)

(73) Assignee: Volvo Technology Corporation, Göteborg (SE)

( * ) Notice: Subject to any disclaimer, the term of this patent is extended or adjusted under 35 U.S.C. 154(b) by 261 days.

(21) Appl. No.: 12/600,260

(22) PCT Filed: May 12, 2008

(86) PCT No.: PCT/SE2008/000327
§ 371 (c)(1),
(2), (4) Date: Nov. 15, 2009

(87) PCT Pub. No.: WO2008/140381
PCT Pub. Date: Nov. 20, 2008

(65) Prior Publication Data
US 2010/0174444 A1    Jul. 8, 2010

(30) Foreign Application Priority Data
May 14, 2007    (WO) ................. PCT/SE2007/000466

(51) Int. Cl.
*G07C 5/08*    (2006.01)
*B60S 5/00*    (2006.01)

(52) U.S. Cl.
USPC ........ 701/29.3; 701/31.4; 701/32.9; 701/33.7

(58) Field of Classification Search
USPC ................... 701/29.3, 29.1, 29.4, 30.2, 30.5, 701/30.6, 30.7, 31.4, 32.1, 32.9, 33.4, 33.7, 701/31.9; 702/34
IPC ...................................... G07C 5/08; B60S 5/00
See application file for complete search history.

(56) References Cited

U.S. PATENT DOCUMENTS 5,737,215 A    4/1998    Schricker et al.
5,809,437 A    9/1998    Breed
(Continued)

FOREIGN PATENT DOCUMENTS

WO    0131448 A1    5/2001
WO    0143079 A1    6/2001

OTHER PUBLICATIONS

International Search Report for corresponding International Application PCT/SE2008/000327.

(Continued)

*Primary Examiner* — Keith Frisby
(74) *Attorney, Agent, or Firm* — WRB-IP LLP

(57) ABSTRACT

A diagnosis and maintenance method, a diagnosis and maintenance assembly comprising a central server and a system, and a computer program for diagnosis and maintenance for a plurality of systems, particularly for a plurality of vehicles, wherein each system provides at least one system-related signal which provides the basis for the diagnosis and/or maintenance of/for the system are provided. The basis for diagnosis and/or maintenance is determined by determining for each system at least one relation between the system-related signals, comparing the compatible determined relations, determining for the plurality of systems based on the result of the comparison which relations are significant relations and providing a diagnosis and/or maintenance decision based on the determined significant relations.

24 Claims, 2 Drawing Sheets

(56) References Cited

U.S. PATENT DOCUMENTS

| | | | |
|---|---|---|---|
| 6,609,051 B2 * | 8/2003 | Fiechter et al. | 701/29.3 |
| 6,735,549 B2 * | 5/2004 | Ridolfo | 702/181 |
| 6,766,232 B1 | 7/2004 | Klausner | |
| 7,069,124 B1 * | 6/2006 | Whittaker et al. | 701/28 |
| 7,243,009 B2 * | 7/2007 | Kaji | 701/21 |
| 7,751,955 B2 * | 7/2010 | Chinnadurai et al. | 701/29.3 |

OTHER PUBLICATIONS

European Search Report (Sep. 26, 2012) for corresponding European App. EP 48 75 3947.

* cited by examiner

REMOTE DIAGNOSIS MODELLING

BACKGROUND AND SUMMARY

The present invention relates to a diagnosis and maintenance method, a diagnosis and maintenance assembly comprising a central server and a system, and a computer program for fault detection for a plurality of systems, particularly for a plurality of vehicles, wherein each system provides at least one system-related signal which serves as basis for the diagnosis and/or maintenance of/for the system.

Even if the invention will be described in the following more in detail in regard to its application to vehicles it is also usable for any other mechatronic or electronic system. The detailed description relates to a preferred embodiment, only, and shall in no way be understood to limit the scope of the invention.

Other mechatronic or electronic systems are for example elevators, robots, cash machines, escalators, airplanes, boats and their sub-systems. An important sub-system is for example a sensor network. Moreover, the invention can be used for data networks or telecommunication for monitoring and detecting anomalies in different sub-systems such as routers. Additionally, the inventive method enables classification of different driving scenarios and different usage of vehicles for improving service planning and up-times.

From the state of the art there are diagnosis and maintenance methods known which allow a monitoring of a single or a plurality of vehicles wherein vehicle status, service requirements, maintenance records and operational characteristics are transmitted from the vehicles to a service centre which provides diagnosis and maintenance. The collected data are compared to standard data previously defined for each vehicle. Based on detected deviations from the standard data the service centre determines whether repair, service or maintenance is necessary. The service centre is also enabled to transmit updates or to modify maintenance schedules for the vehicles.

For example, service requirements like replacement of wear parts such as engine oil, oil filters, breaking disks or windscreen wiper blades used to be defined by a certain numbers of days or a certain mileage. After expiration, the vehicle was asked to come to a repair shop for performing the defined necessary maintenance. This maintenance was performed even if the wear parts were still usable. This results in frequent stops at a repair shop, which also means that the vehicle is not usable during that time, which in turn results in increased costs due to the enforced idle period, particularly if commercial vehicles are concerned.

On the other hand, the service intervals for a vehicle for securing the availability of the vehicle have to be short in order to detect errors or faults before their occurrence. Additionally, in case a vehicle is in fact malfunctioning the search for the fault consumes a lot of time due to the plurality of different mechanical and electrical components. For reducing the diagnosis and subsequent repair time a constant monitoring of the vehicle by several sensors and transmitting the corresponding plurality of signals to the service centre would be necessary. Even with the help of wireless communication the sheer mass of data from a single vehicle to the service centre bars this possibility. Therefore, most methods use a limited set of parameters which are determined in advance to monitor the status of a vehicle and correspond to pre-selected subsystems of the vehicle. In case one parameter deviates from a previously defined standard for this parameter, the vehicle is asked to come to the repair shop for repair, maintenance or diagnosis. But in case a fault occurs in a subsystem that is not monitored, all vehicle systems have to be searched for the fault's origin, which is very time-consuming.

A further disadvantage of the methods known from the state of the art is that the standard values for the monitored parameters are defined as ideal values which are likely not to mirror the reality and are mostly not adaptable during the life time of a vehicle so that aging effects cannot be taken into account.

It is desirable to provide an improved diagnosis and maintenance method and assembly which allows for a detection and prediction of errors in a plurality of systems in short time and for optimized maintenance.

The inventive concept is, according to an aspect thereof, based on the fact that system-related signals provided by each system which describe the status of the system can or cannot show a significant relation between them. The determination whether a relation is significant or not can be performed by comparing the compatible relations between the systems. For this comparison it is preferred to use an appropriate metric. In case a significant relation is detected, this significant relation can be compared between systems, or compared for single systems over time, and used as a basis on which a decision on a necessity for providing maintenance and/or repair to an individual system can be reached. The proposed method, according to an aspect thereof, can also be updated with time, and thus adjust to e.g. wear, and can monitor subsystems that were not considered in the initial design phase. Additionally, the significant relation also relates the fault to a sub-system, whereby the time for the search for a malfunction can be reduced.

The relation can occur between same system-related signals at different time points, which allows a detection of an aging behaviour of the system, or between different system-related signals at same time-points which can be an indication for an interaction between the systems or system-parts which are characterized by the corresponding system-related signal. Additionally, it is also possible to determine a relation between different system-related signals at different time-points which can indicate an aging behaviour of the interaction between systems or system-parts.

In a preferred embodiment the relation is defined by a linear or non-linear correlation wherein also autocorrelation can be regarded. For example linear or nonlinear correlations can be represented by eigenvectors of a correlation matrix. Another preferred embodiment is the observed joint distribution of observed values, which can preferably be expressed through histogramming or clustering, wherein the latter can be with or without topological information.

Additionally, it is preferred to define a norm for the detected significant relation, wherein advantageously the norm is defined by comparing the significant relations for the plurality of systems. Further, it is preferred to detect a deviation from this defined norm. The decision whether maintenance and/or repair is necessary can then be based on the existence of a detected deviation from the norm and/or whether the detected deviation is significant.

The advantage of defining the norm by comparing the significant relation for all systems is that the reality can be taken into account. The defined norm is determined by the systems themselves under real operation conditions and not through idealised values determined e.g. under laboratory or test-bench conditions. Additionally, since it is not a priori defined which system is to be investigated but the occurrence of a significant relation between system-related signals is determined, any system can be investigated as long as there are system-related signals available that are influenced by an operation of the system.

The definition of the norm and/or the detection of a deviation from the norm are preferably performed by statistical methods, particularly statistical classification methods, wherein the significance of the deviation can be quantified by a statistical confidence test.

In a preferred embodiment the determination of a relation between system-related signals is performed by fitting a model to the signals, whereby the model, associated model parameters, a model output and a fitting quality are defined. The model captures the relations between the system-related signals and consequently represents a reduced representation of the data since, for example, only the model parameters or model outputs need to be regarded for gaining information on the system. Whether the relations are significant or not can then be determined by considering the fitting quality and the variance of the models within the plurality of systems. In addition, a cross validation of the models can be performed.

Analyzing the changes in the fitted model allows for e.g. a detection of a malfunction in a system and improving/adapting existing models provides a possibility to adapt the model to aging effects of the systems.

In a preferred embodiment, the models are fitted by the systems itself, wherein additionally the systems also perform a selection which sensors and system-related signals are monitored, and subsequently a comparison between the fitted models is performed. Based on the result of the comparison a best model or norm model can be defined which serves as basis for the decision whether maintenance or repair is necessary.

Additionally, it can be advantageous to define the norm by defining norm values for the model parameters and/or the model output, wherein for the determination of the norm values the model parameters/outputs of all systems are regarded.

In a preferred embodiment the definition of the norm values for the model parameters and/or the model output are performed by statistical methods. A simple but sufficient possibility is to calculate average values for the model parameters and/or outputs. Whether a deviation from the norm occurs can then be determined by detecting whether the model parameter/output under investigation is outside a range defined by a suitable parameterised distribution around the average value, for example given by a Gaussian probability density model.

In a further preferred embodiment the significant relation is monitored, particularly by constantly determining the model parameters and/or outputs for the significant relation and comparing the model parameters and/or outputs to the corresponding norm values, whereby a deviation from the norm values can be detected. Additionally, it is preferred to continue to adapt the model for mirroring changes, for example, due to aging effects. This is done by repeatedly fitting different models and selecting suitable models. This has the advantage that an interaction between systems can be detected that occurs only after some use or only during use in certain environments. For example the wear of a vehicle in a dry and hot environment such as a desert differs from the wear of a vehicle in humid environments. Consequently, the significant relations and their norm differ not only from the beginning but also during operation of the vehicle.

In a preferred embodiment the system performs the step of determining the relation and/or the fitting of the model itself. This results in a reduction of data volume which is transmitted to a central server, particularly a service centre, for the decision whether maintenance or repair needs to be performed. The remaining steps such as comparing the relations, determining the significant relations, detecting a deviation and deciding whether the detected deviation is significant for the need of maintenance or repair are preferably performed by the central server, which can take into account the relations of a plurality of systems. But it is also possible that the central server performs all steps and the systems just provide the system-related signals to the central server, or, vice versa, that the systems perform all steps, or that the assignment of the steps to system/central server differs.

According to another preferred embodiment, wireless communication units are provided for the communication between central server and systems.

For a further reduction of data volume it can be advantageous to send a request for the determination of a relation between predetermined system-related signals, wherein the selection between which system-related signals a relation should be determined can be performed by using random and/or deterministic search methods.

Further advantages and preferred embodiments are defined in the description and the figure.

BRIEF DESCRIPTION OF THE DRAWING

The present invention will be more readily apparent to those skilled in the art during course of the following description, wherein reference is made to the accompanying figure which illustrates a preferred embodiment of the invention.

The single FIGURE shows.

DETAILED DESCRIPTION

Figure 1:
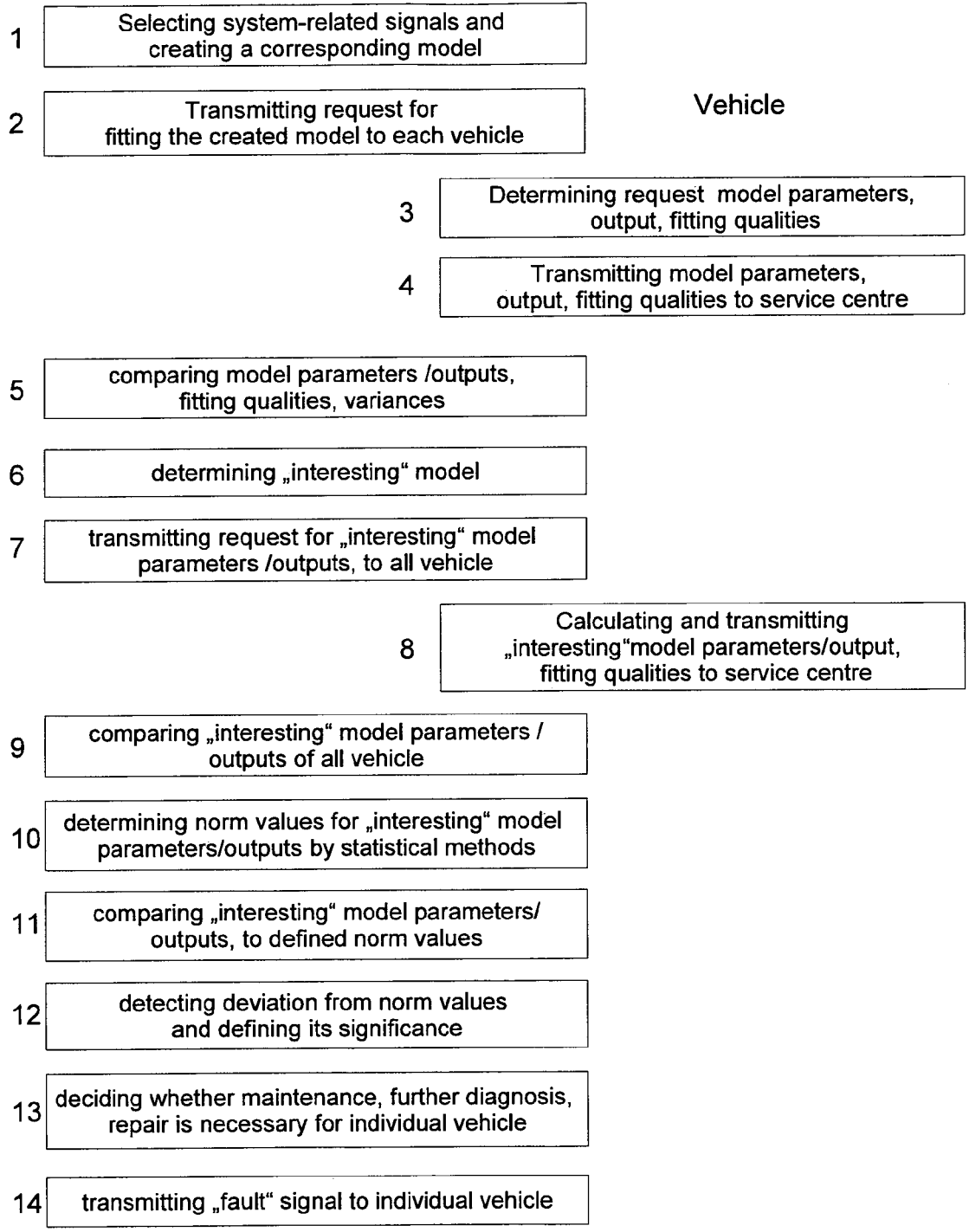
FIG. 1: a flow diagram for a preferred embodiment of the method according to the present invention.

In the following the invention is described for a fleet (=plurality) of vehicles, each of the vehicles comprising several sub-system for which maintenance and diagnosis should be provided. The sub-system regarded in the following as preferred embodiment is an air suspension system for which diagnosis and maintenance is performed. The air suspension system serves as exemplary system only. Every other sub-system included in a vehicle or even the vehicle itself could be regarded.

Even if the invention is described for a fleet of vehicles it is also usable for any mechatronic or electronic system as for example elevators, robots, cash machines, escalators, airplanes, boats and their sub-systems. An important sub-system is for example a sensor network. Moreover, the invention can be used for data networks or telecommunication for monitoring and detecting anomalies in different sub-systems such as routers. Additionally, the inventive method enables classification of different driving scenarios and different usage of vehicles for improving service planning and up-times.

The exemplary regarded air suspension system provides system-related signals as for example pressure (P) and level (L) at a bellow and accumulator tank pressure (Pw), which are provided for example by sensors arranged at the bellow and the wet tank. If an air cooling system is investigated, system-related signals such as for example Vfan (fan speed), $\tau$ (engine torque) and Tcm (temperature of the cooling media) could be regarded just as well. The system-related signals can be chosen randomly or deterministically by an engineer and/or a specialist to the system.

With the inventive method it is also possible to discover unknown relations between system-related signals which can occur in brand new vehicles but also relations which develop over the life time of a vehicle. Therefore, even relations which indicate aging effects can be used for maintenance and diagnosis.

For the discovery of unknown relations the system-related signals for which relations are determined are randomly chosen. Thereby, it is also possible to determine relations between system-related signals of a first sub-system and system-related signals of a second sub-system, wherein the sub-systems are part of a main-system. For example, is it possible to discover whether there might be a relation between the temperature of the braking disks (=system-related signal for a braking system=sub-system 1) in a vehicle (=main-system) and the temperature of an air cooling medium (=system-related signal for an air cooling system=sub-system 2) in the same vehicle (=main-system).

It goes without saying that not only two sub-systems or two system-related signals of sub-systems, as described above, can be investigated but a plurality of sub-systems and/or a plurality of system-related signals. It is also understood that it is possible to regard a single vehicle and in the vehicle for example an engine comprising at least two injectors, wherein the injectors serve as the plurality of systems and the system-related signals are for example the injection nozzle opening and the injector temperature. From that it is clear that every product which can be regarded as mass product in the slightest way can serve as system.

Whether there is a relation is not determined by the single investigated (main-) system but by a plurality of (main-) systems which determine relations for the same chosen system-related signals of the (main-)system or of sub-systems of the main-system. In case, for example, most of the (main-) systems show a relation between the chosen system-related signals it is likely that the relation is also a significant relation.

Even if there is no relation detected between system-related signals for a brand-new vehicle, a relation might develop during life time of the vehicle. Therefore, it is possible, and even desirable, to re-determine relations between system-related signals after a certain time period.

In the preferred embodiment described with reference to the flow diagram shown in FIG. 1 the determination whether there is/are a relation/s is performed by fitting a model to the system-related signals to be investigated, whereby the model, associated model parameters, a model output and a fitting quality can be defined. The model encodes the relations between the system-related signals that are part of the system. For example as defined above the investigated subsystem can be the air suspension system of a vehicle.

Figure 2:
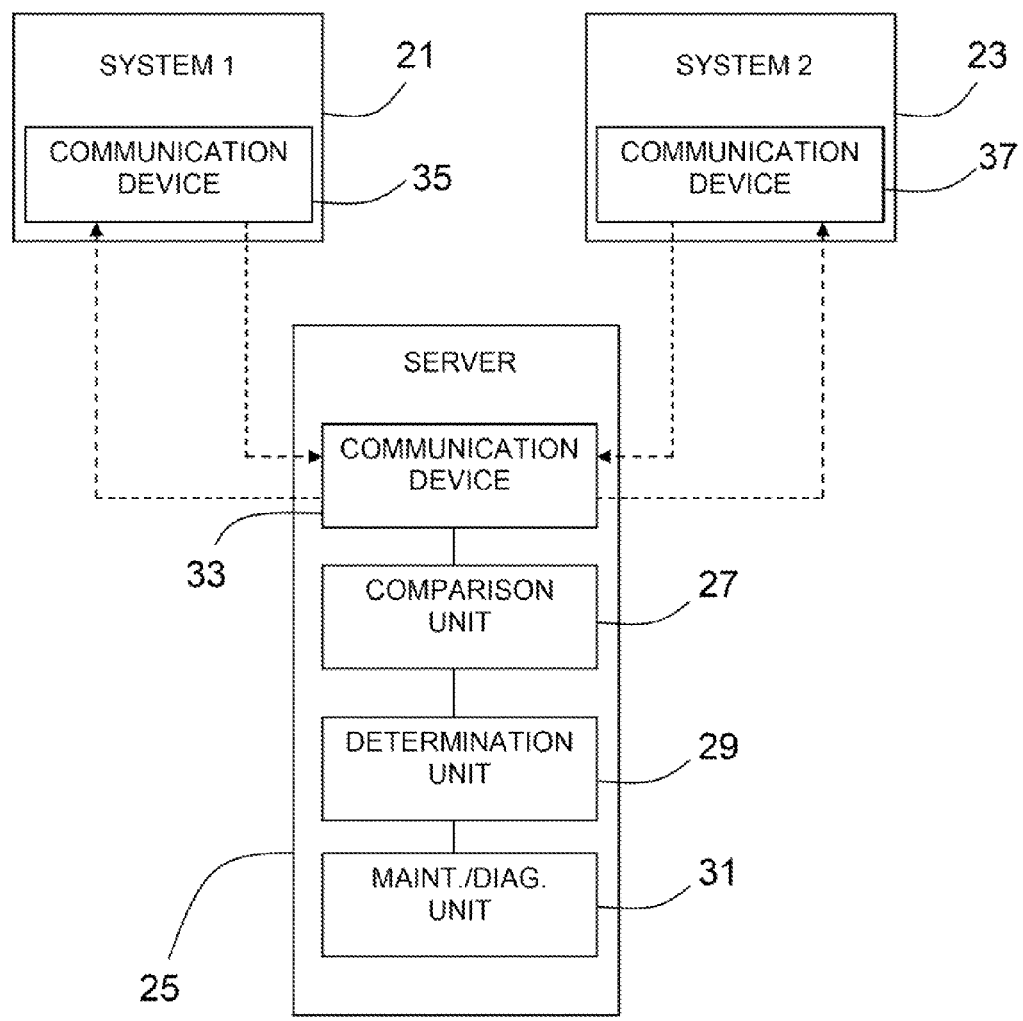
FIG. 2: is a schematic view of an assembly according to an aspect of the present invention.

The vehicle itself comprises a determination unit, for example an on-board computer, which is adapted to fit a model to system-related signals. The system-related signals in turn can be derived from a sensor network or a single sensor within the vehicle, wherein the signals can be transmitted from the sensors to the determination unit by, for example, communication busses or a vehicle-intern communication network. As seen in FIG. 2, an assembly for performing the diagnosis and maintenance method can comprise at least two systems 21 and 23 for which diagnosis and/or maintenance are performed. Each system 21 and 23 provides at least one system-related signal and each system is adapted to determine at least one relation between the system-related signals. The assembly further comprises a central server 25 including a comparison unit 27 for comparing the compatible determined relations, a determination unit 29 for determining based on the result of the comparison which relations are a significant relations, and a diagnosis/maintenance unit 31 for providing a diagnosis and/or maintenance decision based on the determined significant relations. Both the central server 25 and each system 21 and 23 further each include a communication device 33, 35, and 37, respectively. The communication device 33 of the central server 25 is adapted to transmit to each system 21 and 23 a request for at least one relation between system-related signals, the communication device 35 and 37 of each system 21 and 23, respectively, is adapted to receive the request and to transmit the requested relation, and the communication device of the central server is further adapted to receive the transmitted requested relation.

FIG. 1 shows a flow diagram of a preferred embodiment of the inventive method, wherein in a first step 1 the system-related signals for which a relation should be determined are selected. This selection can be performed for example by a service engineer or a specialist working at a service centre (comprising a central server) which provides maintenance and diagnosis to a fleet of vehicles. The system-related signals that are used can also be configured automatically for example by the service centre itself. For the selection of system-related signals a random or deterministic search method can be used, wherein the deterministic search method can be based on collected data of a single vehicle.

In a second step 2, the service centre specifies a model structure for the system-related signals, which describes the relations to be investigated and therefore characterises systems, subsystems or cross-relations between systems. This model specification is transmitted to the plurality of systems or in the regarded case to each vehicle in the fleet. It is also possible to send out different signal configurations to each vehicle (system) and let an optimization algorithm in every vehicle fit a model to the measured data during operation of the vehicles (step 3). The fitting of the model creates data on the model, the model parameters, the model output and the fitting quality.

For example, the regarded air suspension system comprises a number of system-related signals that are measured continuously, for example pressure (P) and level (L) at a bellow and the accumulator tank pressure (Pw). These system-related signals form a list of potentially interesting signals $$S \in \begin{bmatrix} P(t) \\ P(t_1) \\ M \\ P(t_k) \\ L(t) \\ L(t_1) \\ M \\ L(t_k) \\ P_w(t) \\ P_w(t_1) \\ M \\ P_w(t_k) \end{bmatrix} \qquad \text{(Eq. 1)}$$

where the signals are measured at times t1 to tk

From the signal list and the model specification it is possible to fit a model, for example a difference equation, that describes the relations between all or some of these signals, whereby the service centre can control what signals in the list that will be a part of the model, and all possible combinations can be fitted.

For example:

Model 1:

$$L(t)=a \cdot L(t_1)+b \cdot P(t)+c \qquad \text{(Eq. 2)}$$

or Model 2:

$$L(t)=a \cdot L(t_1)+b \cdot P(t)+c \cdot P_w(t)+d \qquad \text{(Eq. 3)}$$

wherein the model parameters M=[a b c] (or M=[a b c d] for the latter case) can be found through an optimization method (such as the least squares method) applied to the measured data on a single vehicle. This parameter fitting can be done on the vehicle and each vehicle returns a set of parameters describing the observed relations for that specific vehicle.

Special care must be taken for signals with a constant value. Dependent on the model they have to be explicitly excluded, for example for linear models based on lags. In other models an explicit exclusion is not necessary because they are automatically disregarded e.g. because they have no covariance.

The model parameters fitted by each vehicle as well as the model output and the fitting quality are transmitted in a further step 4 from each vehicle back to the service centre.

The service centre compares in step 5 how well different vehicles have fitted their specified models, and then selects the best model specification by comparing models, model parameters, model outputs, fitting qualities and how the model parameters vary between the vehicles (step 6).

In step 6 the service centre determines whether the relations described by the model configuration are significant or not by comparing the fitting qualities, calculating and comparing the variance of the models and performing a cross validation for the models of all vehicles. It is also possible that the service centre tests how well different signal configurations can be fitted by sending the configurations to all vehicles in a fleet where each vehicle then only sends back how well it managed to make a fit (fitting quality). In this manner the most suitable configuration can be found as the configuration with the lowest fitting error and/or the largest spread of parameters. It goes without saying, that a configuration can also be regarded as most suitable configuration that shows reasonable values only for a single vehicle, but shows a very stable and high quality (e.g. low noise) relation so that the configuration is worth a try. By accepting also such a configuration as most suitable configuration it is for example possible to disregard environmental influences, since it is possible that the vehicle showing the stable relation is operated under completely different conditions than all other vehicles in the fleet.

In case a configuration is found which corresponds to a significant relation between the system-related signals with a significant spread in these relations between vehicles, this configuration is marked as "interesting" configuration. It is possible to select more than one configuration as a "interesting"-configuration, if, for example, it is not possible to discriminate between them (e.g. if the confidence range of the fitting error overlap with the range of a different model).

In a next step 7, the chosen "interesting" model/s is/are transmitted to all vehicles in the fleet and is/are continuously adapted (fitted) by all vehicles in the fleet (step 8). Subsequently each vehicle transmits back constantly calculated model parameters, model outputs and fitting qualities (step 8). On the basis of these data it is then possible to provide decisions on needs for maintenance or diagnosis for each individual vehicle.

After a certain amount of adaptation time, or enough vehicles observed, enough model parameters, outputs and fitting qualities have accumulated in the service centre, so that the service centre can determine, in steps 9 and 10 a norm for the model parameters and/or model outputs by comparing the model parameters of all vehicles, whereby a suitable statistical method can be used. For example, it is possible to simply calculate averages and standard deviations for the model parameters. The comparison of models is done using a distance metric appropriate for the type of model, for example a Euclidean metric between parameters, a Mahalanobis metric between model parameters, a Krzanowski similarity for vectors, a distance between cluster centers, a Hausdorff metric between topological surfaces, etc. Of course not only a linear model as described in the preferred embodiment can be used, but also other statistical methods like e.g. Principal Component Analysis, Self Organising Maps or Random Sample Consensus Method are applicable.

Once the norm values are defined, the data transmitted from the vehicles can be monitored from now on, and can be constantly compared to the corresponding norm value (step 11). If one (or several) of the model parameters/outputs deviate/s significantly from the norm, a problem in the regarded system of that vehicle is likely. Necessary actions can then be taken, such as start of downloading software from the service centre to the vehicle to provide a more detailed diagnosis for that system.

For the determination (step 12) whether there is a significant deviation it is also preferable to use statistical methods. The determination of a significant deviation can be performed for example by a cross-validation experiment, using a covariance matrix Mstd for the model parameters Mk (where k is an index for a population of K vehicles) which are sent continuously back to the service centre. It is also possible that the models are calculated continuously and are only transmitted, for example, in case a change in model parameters or outputs is detected or after a certain predetermined time period.

$$M_{std} = \frac{1}{K-1} \sum_{k=1}^{K} (M_k - \overline{M})(M_k - \overline{M})^T \qquad (\text{Eq. 4})$$

wherein Mstd is the covariance matrix for the model parameters for a subset of the vehicles and $\overline{M}$ is the average value of the model parameters for the same subset of vehicles. The significance can then be determined for example by a statistical confidence test which determines, if the parameters of a model from one vehicle are significantly different from those in the subset (fleet) of models (vehicles). A possible statistical test is to compute the probability for the observed deviation between the single vehicle and the subset under the assumption of, e.g., a multivariate normal distribution.

In case a significant deviation is detected, the service centre can set in step 13 a "fault" signal for that system for which the deviation was detected and transmit a message to the vehicle that for example maintenance, repair or further diagnosis is necessary (step 14).

Additionally, the service centre can comprise a mechanism that enables the service centre to remove models from vehicles in the population that have been used in an environment or in a manner that deviates from the other vehicles before the values are determined. For example a vehicle is idle during a longer period of time, for example, due to repair or holiday of the user, or a vehicle is unexpectedly used in a different environment for example if a vehicle is used in a desert while it is normally used in a temperate climate.

The invention claimed is:

1. A method for providing diagnosis and/or maintenance for a plurality of systems, each system providing a plurality of system-related signals, the method comprising:
   determining, for the plurality of system-related signals for the plurality of systems, relations between a plurality of the plurality of system-related signals;
   comparing the plurality of determined relations between the plurality of the system-related signals;
   determining, based on the comparison, which of the determined relation are significant relations; and
   providing a diagnosis and/or maintenance decision based on the determined significant relations.

2. The method according to claim 1, wherein the step of determining the plurality of relations is performed
   between the same system-related signals at different points in time and/or
   between different system-related signals at the same point in time and/or at different points in time.

3. The method according to claim 1, wherein at least one of the plurality of relations is a linear or non-linear correlation, and/or at least one of the plurality of relations is particularly expressed by histogramming or clustering with or without topological information.

4. The method according to claim 1, further comprising at least one of the additional steps of:
defining a norm for the determined significant relations, particularly by comparing the significant relations for the plurality of systems,
detecting a deviation from the norm, and
determining a significance of the deviation from the norm, wherein the steps of detecting a deviation and determining its significance are performed by statistical methods, wherein the step of determining a significance of the deviation is performed by a statistical confidence test.

5. The method according to claim 4, wherein the diagnosis and/or maintenance decision is provided for an individual system from the plurality of systems, wherein the diagnosis and/or maintenance decision is provided based on the detected deviation of a significant relation from its norm.

6. The method according to claim 1, wherein the determination of the plurality of relations is performed by fitting a model to the signals, wherein the model, associated model parameters, a model output and a fitting quality are defined.

7. The method according to claim 6, further comprising at least one of the additional steps of
performing a cross-validation for the fitted models
determining a variance of the fitted models within the plurality of systems, wherein the determination of the significant relation preferably takes into account the fitting quality of the model and/or the variance of the models.

8. The method according to claim 6, wherein the step of defining, the norm comprises:
defining norm values for the model parameters and/or the model output, wherein said norm values are determined from the model parameters and/or model outputs of all systems.

9. The method according to claim 8, wherein the norm values for the model parameter and/or model outputs are defined by statistical methods, particularly calculating average values M, wherein M=[a b c] and a, b, c =model parameters/outputs, and/or covariance matrices for the model parameter/outputs of all systems, and wherein the significant deviation from the norm is defined if the model parameters and/or outputs are outside an allowed range defined by a suitable parameterised distribution.

10. The method according to claim 6, wherein the determination of the plurality of relations and/or the fitting, of the model is performed by each system itself, and the other steps are performed by a service centre, wherein the service centre sends a request for the determination of the relation to each system.

11. The method according to claim 1, wherein the significant relations are monitored for detecting a deviation from the norm, wherein the monitoring is performed by constantly fitting different models, selecting a suitable model from the fitted models and comparing the model parameters of the suitable fitted model to norm values.

12. The method according to claim 1, wherein the plurality of system-related signals for which relations are determined are randomly and/or deterministically selected.

13. The method according to claim 1, wherein the system is a mechatronic or electronic system.

14. An assembly for performing diagnosis and maintenance, comprising:
at least two systems for which diagnosis and/or maintenance are performed, wherein each system of the at least two systems provides a plurality of system-related signals, the at least two systems being adapted to determine a plurality of relations between the system-related signals, and
a central server including
a comparison unit for comparing the plurality of determined relations;
a determination unit for determining based on the result of the comparison which of the determined relations are significant relations;
a diagnosis/maintenance unit for providing a diagnosis and/or maintenance decision based on the determined significant relations.

15. The assembly according to claim 14, wherein both the central server and each system of the at least two systems further each include a communication device, wherein the communication device of the central server is adapted to transmit to each system of the at least two systems a request for a plurality of relations between system-related signals, the communication device of each system of the at least two systems is adapted to receive the request and to transmit the requested plurality of relations, and the communication device of the central server is further adapted to receive the transmitted requested plurality of relations.

16. The assembly according to claim 14, wherein each system of the at least two systems is adapted to determine the plurality of relations between the same system-related signals at different time points and/or between different system-related signals at the same and/or different time points.

17. The assembly according to claim 14, wherein each of the systems of the at least two systems is further adapted to perform a fitting of a model to the signals, wherein the model, associated model parameters, a model output and a fitting quality are defined.

18. The assembly according, to claim 14, wherein the central server is adapted to perform a selection of the system-related signals for which the plurality of relations are determined, wherein said selection is performed by using, random and/or deterministic search methods.

19. A central server which is adapted to be part of an assembly according to claim 14.

20. A non-transitory storage medium comprising a computer program to be executed by a central processing unit (CPU) that is part of a central server according to claim 19 for providing diagnosis and/or maintenance for a plurality of systems.

21. A computer readable medium comprising a computer program according to claim 20.

22. A system providing at least one system-related signal which is adapted to be part of an assembly according to claim 14, wherein the system is a mechatronic or electronic system.

23. A method for providing diagnosis and/or maintenance for a plurality of systems, each system providing a first and a second system-related signal, the method comprising:
determining for each system relations between the first and second system-related signals to provide a plurality of determined relations:
comparing the plurality of determined relations;
determining, based on the results of the comparison, which of the plurality of determined relations are significant relations; and
providing a diagnosis and/or maintenance decision based on the determined significant relations.

24. An assembly for performing diagnosis and maintenance, comprising:
at least two systems for which diagnosis and/or maintenance are performed, wherein each system provides a first and a second system-related signal and each system is adapted to determine relations between the first and second system-related signals to provide a plurality of determined relations; and a central server including
- a comparison unit for comparing the plurality of determined relations,
- a determination unit for determining based on the result of the comparison which of the plurality of determined relations are significant relations, and
- a diagnosis/maintenance unit for providing a diagnosis and/or maintenance decision base on the determined significant elations.

* * * * *